United States Patent Office 2,709,698
Patented May 31, 1955

2,709,698

AZO DYES DERIVED FROM HYDROQUINONE MONO-ETHERS

Joseph Seruto, Meriden, Conn., assignor to American Cyanamid Company, New York, N. Y., a corporation of Maine No Drawing. Application June 17, 1949,
Serial No. 99,862

12 Claims. (Cl. 260—200)

This invention relates to a new series of metallizable monoazo dyes.

Monoazo dyes are among the cheapest dyestuffs which can be prepared, but they suffer from a limited color range; comparatively few are available in black, green or blue shades, and most of these few require unusual and roundabout processes involving expensive and uncommon diazo or coupling components. The others show inferior dyeing or fastness properties. As a result, most of the good black, green, or blue dyes are polyazo dyes and, in general, they are more expensive than the monoazo dyes which can be used for the other color shades.

The metallizable monoazo dyes of the present invention have the unusual properties of giving good black, green or blue shades with many common diazo components and show excellent dyeing characteristics and light fastness. A good method of preparation is by coupling diazo components with monoethers of hydroquinone and to have the following general formula:

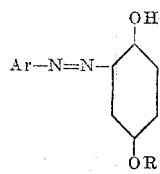

in which R is a hydrocarbon radical and Ar is a sulfonated aromatic radical substituted ortho to the azo linkage by a lake-forming group such as hydroxyl, methoxyl, carboxyl or halogen. The dyes are particularly useful in the form of their metal complexes. The diazo component should be free from lake-forming units other than the azo linkage and the groups ortho thereto, because such lake-forming units, for example, the salicylic acid structure, result in the partial or total formation of lakes which do not involve the azo linkage and which are very inferior dyestuffs. Consequently, the present invention does not include these practically useless products.

The valuable properties of the azo dyestuffs producible by means of the present invention are shared in general by all of the hydroquinone monoethers and are not limited to one or two particular ethers. Thus, for example, in the general formula R may be any alkyl group of which methyl, ethyl, butyl and amyl are typical, or it may be an alkylene radical such as allyl. Aromatic ethers, in which R is an aryl radical such as phenyl, tolyl, or thymyl, are also included, as well as are aralkyl ethers where R may, for example, be benzyl, phenethyl, γ-phenylpropyl, and the like.

Almost any of the usual diazo components may be used so long as they have a lake-forming group ortho to the diazo and are free from other lake-forming structural units. It is an advantage that excellent dyes may be prepared from some of the simplest diazo components, such as 1-amino-2-naphthol-4-sulfonic acid, 4-nitro-2-aminophenol-6-sulfonic acid, and its isomer 6-nitro-2-aminophenol-4-sulfonic acid. Diazo compounds from the first two amines give blue and green dyes respectively, while those from the last give black. Diazo compounds may be used derived from other typical amines such as 4-sulfoanthranilic acid, 5-sulfoanthranilic acid, 2-aminophenol-4-sulfonic acid, 2-amino-4-chlorophenol-5-sulfonic acid, 2-amino-4-chlorophenol-6-sulfonic acid, 2-amino-6-nitroanisole-4-sulfonic acid, and 1-amino-6-nitro-2-naphthol-4-sulfonic acid.

Diazo compounds from heterocyclic amines may also be used to couple with the hydroquinone monoethers. Typical amines are 5-amino-6-hydroxyquinoline-8-sulfonic acid, 1-(p-sulfophenyl)-3-methyl-4-amino-5-pyrazolone, or 2 - (4'-amino-3'-methoxyphenyl)-6-methylbenzothiazolesulfonic acid.

While one of the most important advantages of the present invention lies in the fact that it is possible to produce valuable blue, green and black dyes from common diazo components, it should be understood that the invention is not intended to be limited to dyes of these colors. It is possible also to produce other shades, such as grays, bordeaux, and the like, and these dyestuffs are also included even though they are not as unique as the green, blue and black dyes.

It is not intended to limit the present invention to any particular method of making the dyestuffs. In general, I have found that the coupling proceeds best on the alkaline side. In most cases ready coupling results in strong (35–40%) sodium hydoxide solutions, or in aqueous alkaline pyridine solutions.

The dyestuffs of the present invention are acid dyes and may be used in any dyeing process for which dyes of this nature are suitable. The most important field of practical utilization, however, lies in metallized dyeing and various mordant dyeing processes using metal compounds as mordants. It is an advantage of the present invention that the dyestuffs are readily useful in various types of metallized dyeings such as the so-called "bottom chrome," "top chrome" and "metachrome" processes, as well as in processes in which the metal complexes are formed before incorporation into the dye bath. Among the metal salts which are most useful in producing metallized compounds of the dyestuffs of the present invention are copper, chromium and cobalt. Salts of other metals such as iron and nickel are also useful.

The following specific examples illustrate the preparation of various dyes in accordance with the present invention. Parts are by weight.

Example 1

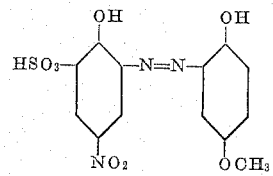

A solution of 23 parts of 2-amino-4-nitrophenol-6-sulfonic acid in 130 parts of 10% sodium carbonate is treated with 35 parts of concentrated hydrochloric acid and 100 parts of ice and diazotized in the usual way with 5N sodium nitrite solution. Excess acidity is then destroyed with sodium bicarbonate and the diazo is added to a solution of 17 parts p-methoxyphenol in 100 parts of water, 120 parts of pyridine, and 29 parts of 5N sodium hydroxide. After thorough stirring, the mixture is allowed to stand five minutes and diluted with 100 parts of water. One hour later it is added to 5000 parts of water, stirred to complete solution, and then neutralized. The product is filtered and dried at 60° C. When dyed on wool by the top chrome method it produces dark green shades with excellent light fastness.

The chromium acetate solution used in metallizations in these examples is prepared as follows: 136 parts of chromic acid is dissolved in 1156 parts of water. To the solution is added 163 parts of glacial acetic acid and 50 parts of glucose. The solution is slowly heated to the boil and gently boiled until the chromic acid is completely reduced. After cooling, the solution is diluted to the volume of 2000 parts of water.

Metallization is carried out by refluxing 2 parts of the above prepared dystuff overnight in 10 parts of water and 12 parts of the above prepared chromic acetate solution. The solution is cooled, treated with 6 parts of concentrated hydrochloric acid, and filtered. The product is washed with acetone and dried. It gives green shades on wool.

*Example 2*

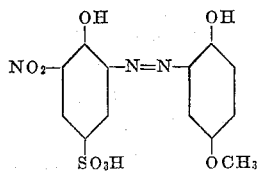

A solution of 50 parts of 6-nitro-2-aminophenol-4-sulfonic acid in 280 parts of 10% sodium carbonate solution is acidified with 72 parts of concentrated hydrochloric acid, treated with 200 parts of ice, and diazotized with 5N sodium nitrite. The diazo solution is then added to a solution of 35 parts of 4-methoxyphenol and 71 parts of 5N sodium hydroxide in 200 parts of water and 240 parts of pyridine. After stirring for fifteen minutes the crystalline product is filtered and dried at 60° C. It gives gray to black chrome dyeings.

Two parts of the dyestuff thus prepared are metallized by refluxing in 100 parts of water, 120 parts chromic acetate solution (prepared as described in Example 1), and 11 parts 5N sulfuric acid. When metallization is complete the product is salted out with 500 parts of sodium chloride, filtered, and dried. It gives black dyeings of excellent fastness.

*Example 3*

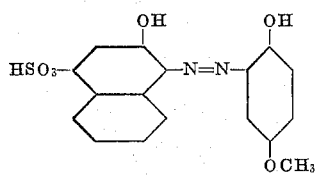

A paste of 80 parts of 4-methoxyphenol and 760 parts of 50% sodium hydroxide is diluted with 300 parts of water and treated at 45–50° with 165 parts of the diazo oxide of 1-amino-2-naphthol-4-sulfonic acid. After one hour's stirring at 40°, the mixture is cooled to room temperature and treated with 500 parts of ice and 1350 parts of concentrated hydrochloric acid. The product is filtered, dried, washed with benzene and then with concentrated sodium bicarbonate, and then dried at 60° C. It gives navy blue chrome dyeings of good fastness and may be metallized according to the procedure described in Example 1.

*Example 4*

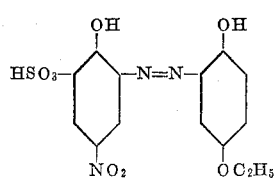

Fifty parts of 2-amino-4-nitrophenol-6-sulfonic acid are dissolved in 280 parts of 10% sodium carbonate solution, acidified with 130 parts of concentrated hydrochloric acid, cooled by the addition of 150 parts of ice, and diazotized. The diazo solution is buffered with sodium bicarbonate solution and added to a solution of 35 parts of p-ethoxyphenol in 100 parts of water, 70 parts of 5N sodium hydroxide, and 120 parts of pyridine. After a short period of stirring, the crystalline product is filtered. It is metallized with chromium acetate, as described in Example 1, to a green dyestuff of excellent fastness.

*Example 5*

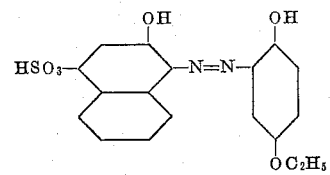

To a vigorously stirred paste of 9 parts of p-ethoxyphenol, 76 parts of 50% sodium hydroxide solution, and 20 parts of water, is added 18 parts of the diazo oxide of 1-amino-2-naphthol-4-sulfonic acid. After six hours' stirring at 30–35° the mixture is treated with approximately its own weight of ice and acidified with 125 parts of concentrated hydrochloric acid. The product is filtered and dried at 60°. It gives navy blue chrome dyeings, and can be metallized by refluxing in water and chromic acetate according to the general procedure of Example 1. The chromium complex is a blue dyestuff of excellent fastness and dyeing properties.

*Example 6*

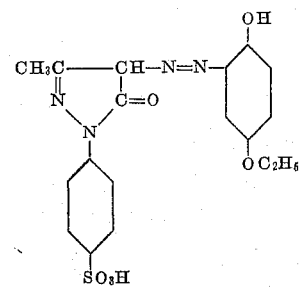

Twenty parts of diazotized 1 - (p - sulfophenyl) - 3-methyl-4-amino-5-pyrazolone and 16 parts of p-ethoxyphenol are made into a paste with 150 parts of 50% sodium hydroxide. Solution is completed by stirring and slowly adding 200 parts of water. Stirring is continued for one hour at room temperautre. The solution is then acidified to pH 3 with the aid of concentrated hydrochloric acid and the product filtered and dried at 60°. Metallization is accomplished by refluxing 15 parts of the dyestuff in 100 parts of water and 50 parts of chromic acetate solution prepared as described in Example 1. After three hours of refluxing, 13 parts of 5N sulfuric acid is added and refluxing continued two hours longer. The product is filtered, washed, and dried. It gives Bordeaux dyeings of excellent properties.

*Example 7*

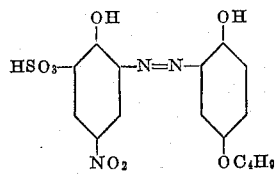

2-amino-4-nitrophenol-6-sulfonic acid is diazotized and coupled with p-butoxyphenol, according to the procedure of Example 1. The resulting dyestuff gives olive green shades of excellent fastness, when dyed on wool by the top chrome method. Metallization with chromic acetate gives the chromium complex, which is a valuable dye for producing dark green shades.

Example 8

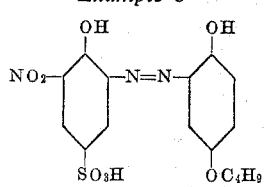

Fifty parts of 6-nitro-2-aminophenol-4-sulfonic acid is diazotized and coupled with 37 parts of p-butoxyphenol in sodium hydroxide-pyridine solution, according to the procedure of Example 1 and subsequent examples. The product gives black chrome dyeings. Metallization is effected in boiling chromic acetate solution at pH 2.7. The product is a black dyestuff of good all-round properties.

Example 9

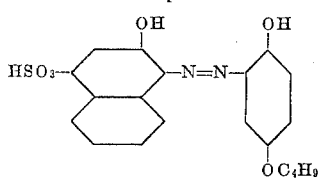

p-Butoxyphenol is coupled with diazotized 1-amino-2-naphthol-4-sulfonic acid in concentrated sodium hydroxide, according to the procedure of Example 5. The product gives navy blue dyeings by the top chrome method. The chromated dyestuff also gives blue dyeings.

Example 10

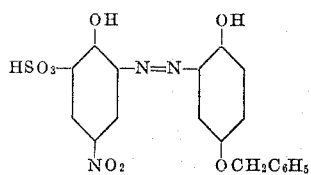

4-nitro-2-aminophenol-6-sulfonic acid is diazotized and coupled with p-benzyloxyphenol in pyridine-aqueous sodium hydroxide medium according to the procedure described in Example 1. The product gives green chrome dyeings. It may be metallized by the procedure described in the above examples.

Example 11

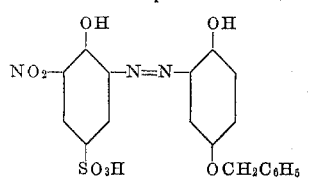

Six parts of 6-nitro-2-aminophenol-4-sulfonic acid are diazotized and coupled with 4 parts of p-benzyloxyphenol. The dye is metallized in the usual manner with chromium acetate and gives valuable black dyeings.

Example 12

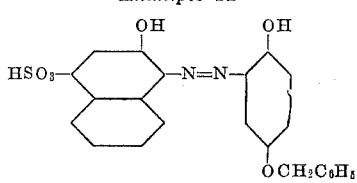

Diazotized 1-amino-2-naphthol-4-sulfonic acid is coupled with p-benzyloxyphenol according to the general procedure of Example 3. The product gives blue dyeings of good fastness by the top chrome method. The chromium complex, which is prepared by the usual method as described in above examples, also gives blue dyeings.

I claim:
1. A monoazo dyestuff of the structure

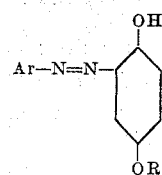

in which R is a hydrocarbon radical having not more than 10 carbon atoms and Ar is a sulfonated aromatic radical containing not more than two rings and having a single complex lake forming group ortho to the azo linkage.

2. A dyestuff according to claim 1 in which the oxygen-linked carbon atom in the radical R is aliphatic.

3. A dyestuff having the following formula

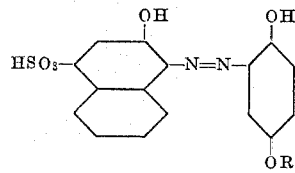

in which R is an aliphatic hydrocarbon radical having not more than 10 carbon atoms.

4. A dyestuff according to claim 3 in which R is ethyl.

5. A dyestuff having the formula

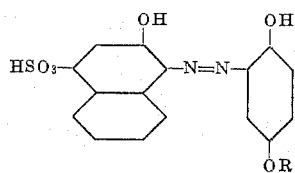

in which R is a hydrocarbon radical having not more than 10 carbon atoms.

6. A dyestuff having the formula

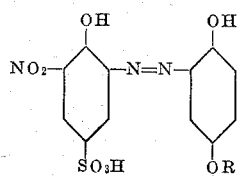

in which R is a hydrocarbon radical having not more than 10 carbon atoms.

7. A dyestuff according to claim 6 in which R is alkyl.

8. A dyestuff according to claim 7 in which the alkyl radical does not contain more than two carbon atoms.

9. A dyestuff having the formula

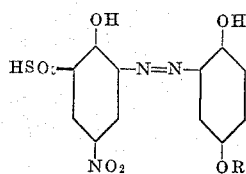

in which R is a hydrocarbon radical having not more than 10 carbon atoms.

10. A dyestuff having the formula

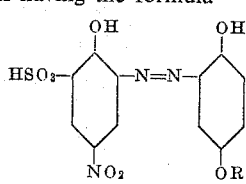

in which R is an aliphatic hydrocarbon radical having not more than 10 carbon atoms.

11. A dyestuff according to claim 10 in which R is alkyl.

12. A dyestuff according to claim 11 in which the alkyl radical does not contain more than two carbon atoms.

References Cited in the file of this patent

UNITED STATES PATENTS

| | | |
|---|---|---|
| 1,011,770 | Geldermann | Dec. 12, 1911 |
| 1,867,083 | Krzikalla et al. | July 12, 1932 |
| 1,947,945 | Lange | Feb. 20, 1934 |
| 2,008,602 | Straub et al. | July 16, 1935 |
| 2,191,040 | McNally et al. | Feb. 20, 1940 |
| 2,495,244 | Felix et al. | Jan. 24, 1950 |
| 2,599,147 | Widmer et al. | June 3, 1952 |

FOREIGN PATENTS

| | | |
|---|---|---|
| 73 | Great Britain | of 1911 |